United States Patent
Ikegame et al.

(10) Patent No.: US 6,229,778 B1
(45) Date of Patent: *May 8, 2001

(54) INFORMATION RECORDING AND/OR REPRODUCING APPARATUS FOR OPTICAL DISKS HAVING VARIOUS PROTECTIVE LAYER THICKNESSES

(75) Inventors: Tetsuo Ikegame; Osamu Nakano, both of Hachioji (JP)

(73) Assignee: Olympus Optical Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/555,793

(22) Filed: Nov. 9, 1995

(30) Foreign Application Priority Data

Nov. 10, 1994 (JP) .................................... 6-276491

(51) Int. Cl.[7] .................................... G11B 7/085
(52) U.S. Cl. .................. 369/54; 369/53.22; 369/53.28
(58) Field of Search ................. 369/44.12, 44.23–44.24, 369/44.32, 54, 58, 112

(56) References Cited

U.S. PATENT DOCUMENTS

| 4,956,833 | * | 9/1990 | Kokado et al. ................... 369/112 X |
| 5,216,649 | * | 6/1993 | Koike et al. ................... 369/44.32 X |
| 5,235,581 | * | 8/1993 | Miyagawa et al. ........... 369/44.23 X |
| 5,321,678 | * | 6/1994 | Takishima et al. ........... 369/44.32 X |
| 5,408,455 | * | 4/1995 | Takishima ................... 369/44.32 |
| 5,729,510 | * | 3/1998 | Kasahara et al. ................. 369/44.14 |
| 5,930,214 | * | 7/1999 | Kasahara et al. ....................... 369/58 |

FOREIGN PATENT DOCUMENTS

| 0414380 | 2/1991 | (EP) . |
| 0452953 | 10/1991 | (EP) . |
| 0470807 | 2/1992 | (EP) . |
| 0537904 | 4/1993 | (EP) . |
| 0610055 | 8/1994 | (EP) . |
| 5-241095 | 9/1993 | (JP) . |
| 6-236570 | 8/1994 | (JP) . |

OTHER PUBLICATIONS

Shigeo Kubota, et al., "An analysis of Eye Diagram Phase Jitter in Optical Disk Systems IV, The Influence of Spherical Aberration Caused by Disk Thickness Error," Jan. 14, 1985, Optics 14, pp. 219–221, with three page English translation of pertinent parts.

Patent Abstracts of Japan, vol. 001, No. 104 (E–044), Sep. 14, 1977, and JP–A–52 037404 (MEI Co. Ltd.), Mar. 23, 1977.

Patent Abstracts of Japan, vol. 95, No. 5, Jun. 30, 1995, JP 07037259A (Ricoh Co. Ltd), Feb. 7, 1995.

* cited by examiner

Primary Examiner—W. R. Young
(74) Attorney, Agent, or Firm—Stevens, Davis, Miller & Mosher, L.L.P.

(57) ABSTRACT

An information recording reproducing apparatus for recording and/or reproducing informations on and/or from an optical recording medium. The apparatus comprises a light source, at least two objective lenses corresponding to at least two kinds of optical recording media having different thicknesses of a protective layer, respectively, a rotatable holder for supporting these objective lenses, magnetically activatable selection elements for these objective lenses in accordance with the optical recording medium, the light of the light source being illuminated on the optical recording medium through the objective lens selected by the magnetically activatable selection elements, thereby performing recording and/or reproducing of the information.

10 Claims, 6 Drawing Sheets

FIG_3
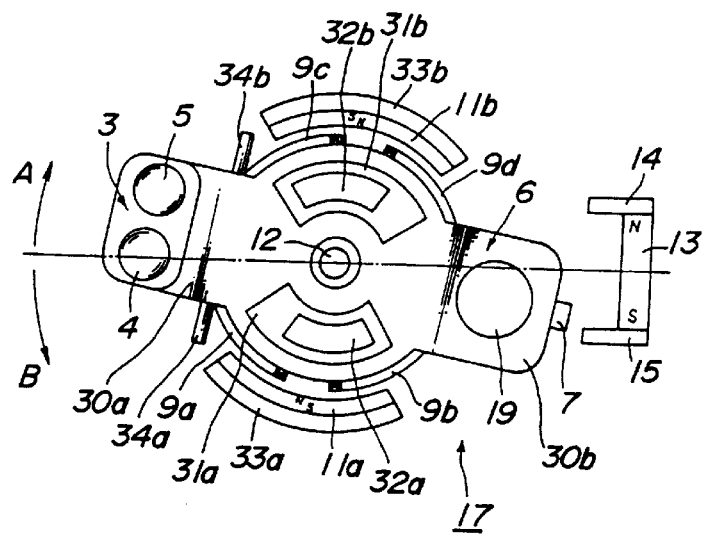
FIG_4
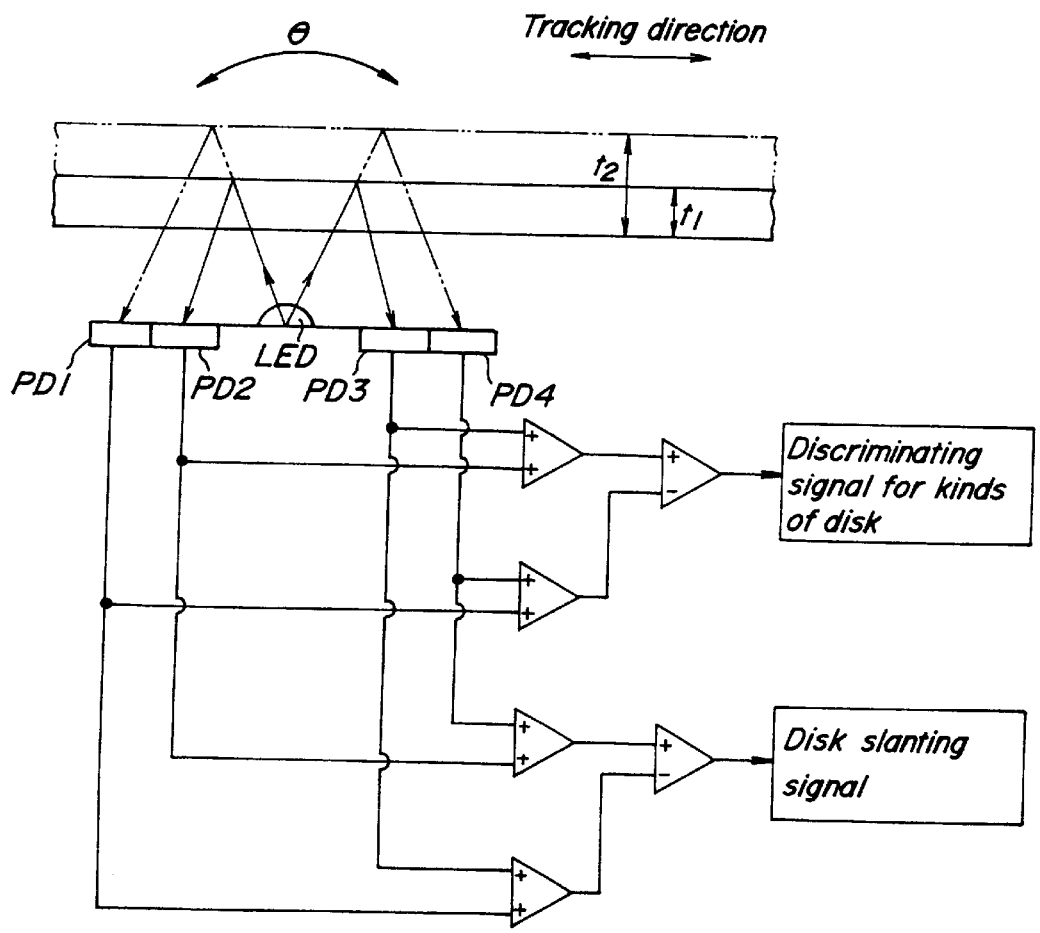

FIG_5
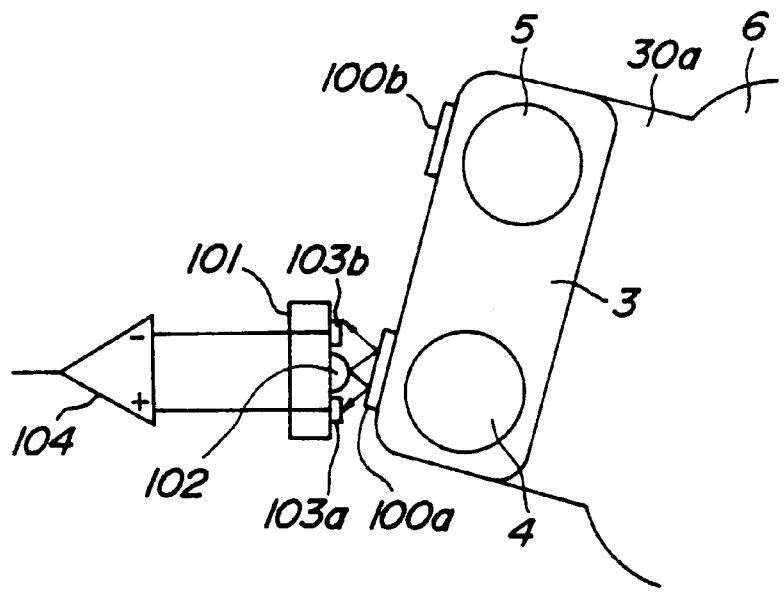
FIG_6
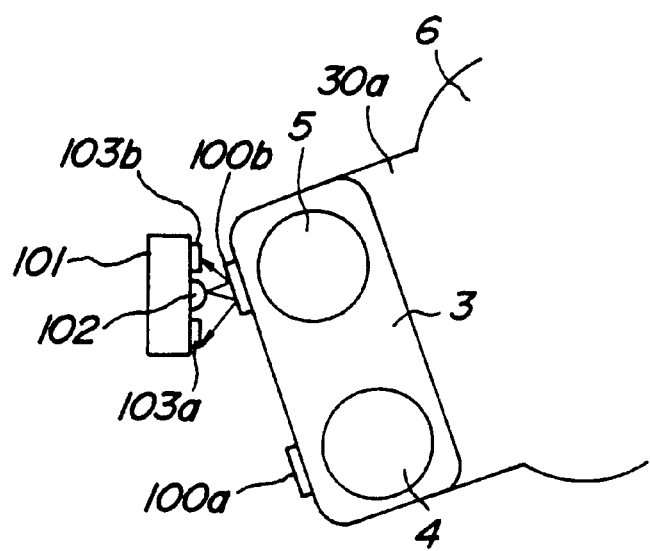

FIG_11
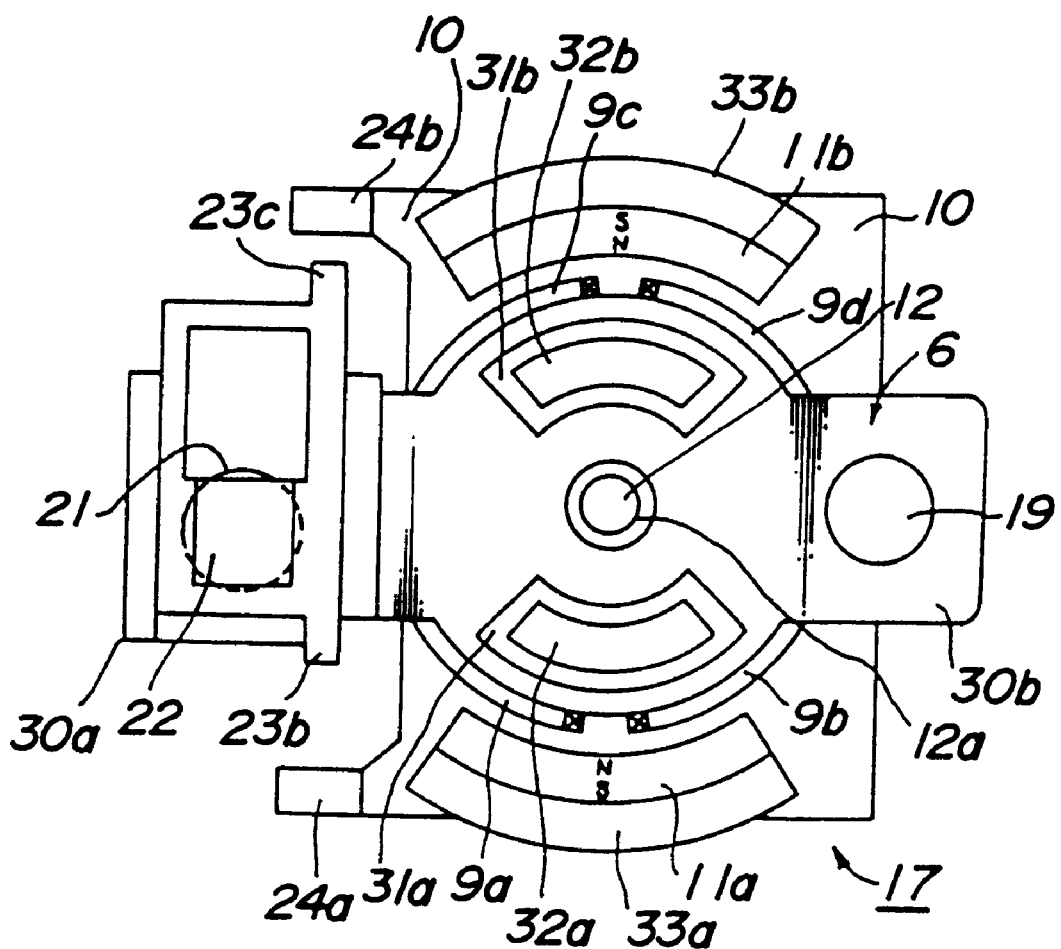

US 6,229,778 B1

INFORMATION RECORDING AND/OR REPRODUCING APPARATUS FOR OPTICAL DISKS HAVING VARIOUS PROTECTIVE LAYER THICKNESSES

BACKGROUND OF THE INVENTION

1. Field of the Invention

The present invention relates to an apparatus for recording and/or reproducing information on an optical recording medium, for example a magneto-optical disk drive, a direct read after write drive (DRAW), a phase changing disk drive, CD-ROM or the like.

2. Related Art Statement

The disks for use in such an apparatus are provided with a protective layer (hereinafter, referred to as a cover glass) such as glass, resin (PC, PMMA or the like) formed on its side surface on which the reading light and the writing light are incident, in order to protect or guard the recording layer of the recording medium. This cover glass has different thicknesses in accordance with the types of the disk, even in the same DRAW disk. For example, the thicknesses of the disks are 1.2 mm for the magneto-optical disk, 1.2 mm and 0.6 mm for the phase changing disk, and 1.2 mm and 0.09 mm for the standard DRAW disk of 356 mm.

An objective lens for use in an optical pick-up of the information recording and/or reproducing apparatus has generally a numeral aperture NA of 0.45–0.6, and is designed by taking aberration caused by the above-discussed cover glass into consideration. On considering allowable level at the reading/writing property of the signal, in the case of the cover glass having a 1.2 mm thickness, the limit of the allowable level is in the order of ±0.05. If the allowable level exceeds this limit value, the reading/writing property of the signal becomes considerably deteriorated. If the reading/writing operation of the signal is performed by exchanging the disks having a different thickness of the cover glass, for example, the disk having 1.2 mm thickness of the cover glass and the disk having 20.6 mm thickness of the cover glass, therefore, it is difficult to perform this reading/writing operation of the signal with one information recording and/or reproducing apparatus. That is, two information recording and/or reproducing apparatus must be required.

In order to remove the above defect, for example, Japanese Patent Application Opened No. 241,095/93 provides the feature of inserting parallel plates between a light source and a collimator to compensate a spherical aberration caused by the difference in thickness of the cover glass of the disk.

However, the optical pick-up disclosed in the Japanese Patent Application Opened No. 241,095/93 has a problem as follows.

For example, a spherical aberration component $\omega_{40}$ of a coefficient of a wave front aberration and a value $\upsilon$ of the wave front aberration, which are caused, for example, in case of passing the light through the cover glass having thickness t can be obtained from "Optics 14" (1985), pp. 219–221 and expressed as follows:

$$\omega_{40} = (t/8) \cdot \{(n_2-1)/n_3\} \cdot NA^4 \quad (1)$$

$$\upsilon = 0.0745 \, |\omega_{40}| \quad (2)$$

wherein the numeral aperture of the objective lens is NA, and the refractive index is n. Therefore, in the pick-up having NA=0.55 and n=1.57 and using the light of wavelength $\lambda$=780 nm, if the disk having the cover glass of t=1.2 mm is exchanged to the disk having the cover glass of t=0.6 mm, the spherical aberration of $\omega_{40}$=0.00260, $\upsilon$=0.0248 $\lambda$rms is generated.

While in case of compensating the above-discussed spherical aberration by arranging the parallel plates for compensation between the light source and the collimator lens, if the numerical aperture at the light source side is NA'=0.25 and the refractive index is n =1.57, the thickness t' of the parallel plates is expressed as follows.

$$t' = \{n_3/(_2-1)\} \cdot (8/NA'^4) \cdot \omega_{40} = 14.07 \text{ mm}$$

Moreover, in order to insert such thick parallel plates between the light source and the collimator lens, the light source must be moved by a following distance l:

$$l = t' \, (1-1/n) = 5.11 \text{ mm}.$$

In such a way, the optical pick-up disclosed in the Japanese Patent Application Opened No. 241,095/93 requires a moving mechanism for inserting the compensating parallel plates and a mechanism for moving the light source in accordance with the insertion of the parallel plates, so that the construction of the apparatus becomes complicated and the optical system becomes large. In the reading/writing operation, moreover, the objective lens is moved with the following up of the eccentricity of the disk by a tracking servo, thereby causing non-coincidence of the light axis of the objective lens to the light axis of the collimator lens, resulting in a generation of comma aberration or astigmatism.

SUMMARY OF THE INVENTION

It is an object of the present invention to eliminate the above described disadvantages of the conventional information recording and/or reproducing apparatus.

It is another object of the present invention to provide an information recording and/or reproducing apparatus capable of performing the reading/writing operation for plural kinds of optical recording media having cover glasses of different thicknesses by means of a unity apparatus.

According to a first aspect of the present invention, there is provided an information recording and/or reproducing apparatus comprising: a light source; at least two objective lenses corresponding to at least two kinds of optical recording media having different thicknesses of a protective layer, respectively; a holder for supporting these objective lenses; a selection means for selecting these objective lenses in accordance with the optical recording medium; the light of the light source being illuminated on the optical recording medium through the objective lens selected by the selection means, thereby performing a recording and/or reproducing of the information.

According to a second aspect of the present invention, there is provided an information recording and/or reproducing apparatus comprising: a light source; an objective lens corresponding to an optical recording medium having a predetermined thickness of a protective layer; a holder for supporting the objective lens; an optical element for converting a wave front for an optical recording medium having a protective layer of thickness different from the above optical recording medium; a selection means for inserting the optical recording medium in an optical path between the objective lens and the optical recording medium, selectively and detachably, in accordance with the thickness of the protective layer of the optical recording medium to be recorded and/or reproduced for the information.

According to a third aspect of the present invention, there is provided an information recording and/or reproducing apparatus comprising: a light source; an objective lens for generating at least two light spots corresponding to at least two kinds of optical recording media having different thicknesses of a protective layer; a holder for supporting these objective lenses; the light from the light source being illuminated on the optical recording medium through the objective lens, thereby performing recording and/or reproducing of the information.

According to a fourth aspect of the present invention, there is provided an information recording and/or reproducing apparatus comprising: a light source; an objective lens corresponding to an optical recording medium having a predetermined thickness of a protective layer; a holder for supporting the objective lens; an objective lens drive means for driving the objective lens relatively for the optical recording medium; a correction optical element capable of displacing the lens unitedly, for compensating a spherical aberration for an optical recording medium having the thickness different from the above optical recording medium.

According to a fifth aspect of the present invention, there is provided an information recording and/or reproducing apparatus comprising: a light source; two optical systems corresponding to two kinds of optical recording media having different thicknesses of a protective layer; a selection means for selecting these optical systems in accordance with the optical recording medium; characterized by comprising: the selection means for detecting the information provided on a cartridge having the optical recording medium accommodated therein, and for selecting either one of said two optical systems.

According to a sixth aspect of the present invention, there is provided an information recording and/or reproducing apparatus comprising: a light source; two optical systems corresponding to two kinds of optical recording media having different thicknesses of a protective layer; a selection means for selecting these optical systems in accordance with the optical recording medium; characterized by comprising: the selection means for detecting the position on the information recording surface of the optical recording medium and the thickness of the protective layer, and for selecting either one of said two optical systems.

According to a seventh aspect of the present invention, there is provided an information recording and/or reproducing apparatus comprising: a light source; at least two optical systems corresponding to at least two kinds of optical recording media having different thicknesses of a protective layer; a selection means for selecting these optical systems in accordance with the optical recording medium; the light from the light source being illuminated on the optical recording medium, thereby performing a recording and/or reproducing of the information; and a detection means for detecting which objective lens of said at least two objective lenses.

In an embodiment of the information recording and/or reproducing apparatus according to the present invention, the selection means includes at least a part of a lens drive means for controlling a relative position of the objective lens for the optical recording medium by displaying the objective lens in predetermined direction during the recording and/or reproducing of the information.

In this case, the construction becomes simple and the apparatus can be downsized and inexpensive.

In a preferable embodiment of the information recording and/or reproducing apparatus according to the present invention, the correction optical element is so constructed that it is intervened selectively in the optical path between the optical recording medium and the objective lens with the use of at least a part of a lens drive means for controlling a relative position of the objective lens for the optical recording medium by displaying the objective lens in predetermined direction during the recording and/or reproducing of the information.

Therefore, the construction becomes simple and the apparatus can be downsized and inexpensive.

According to the first aspect of the present invention, the reading/writing operation can be performed for the plural kinds of the optical recording media in the single apparatus without causing the deterioration of the optical property due to the difference in thickness of the protective layer of the optical recording medium, by selecting the suitable objective lens with the selection means in accordance with kinds of the optical recording medium due to the thickness of the protective layer. The plural objective lenses are exchanged and selected in accordance with the kinds of the optical recording medium, so that the distance between the optical recording medium and the objective lens can be optionally selected as compared with the case of inserting the correction optical element between the objective lens and the optical recording medium, the objective lens having a small operating distance may be used, and the overall construction of the apparatus can be made thin.

According to the second aspect of the present invention, the correction optical element capable of being displaced with the objective lens integrally is intervened selectively in the optical path between the optical recording medium and the objective lens in accordance with kinds of the optical recording medium due to the thickness of the protective layer, so that the reading/writing operation can be performed for the plural kinds of the optical recording media in the single apparatus without causing the deterioration of the optical property due to the difference in thickness of the protective layer of the optical recording medium. Moreover, the correction optical element is displaced with the objective lens integrally, so that they do not collide and thus the correction optical element can be positioned near the objective lens. Therefore, the objective lens having a small operating distance may be used, as compared with the case of inserting only the correction optical element always between the objective lens and the optical recording medium, and thus the overall construction of the apparatus can be made thin.

BRIEF DESCRIPTION OF THE DRAWINGS

FIG. 3 is a plan view showing the actuator shown in FIG. 2;

FIG. 4 is a sensor for discriminating the kind of disks for use in the apparatus shown in FIG. 1;

FIG. 5 is a sensor for discriminating the lens for use in the apparatus shown in FIG. 1;

FIG. 6 is a sensor for discriminating the lens for use in the apparatus shown in FIG. 1;

FIG. 11 is a plan view showing the construction of the actuator used in the third embodiment of the information recording and/or reproducing apparatus according to the present invention.

DETAILED EXPLANATION OF THE PREFERRED EMBODIMENT

Figure 1:
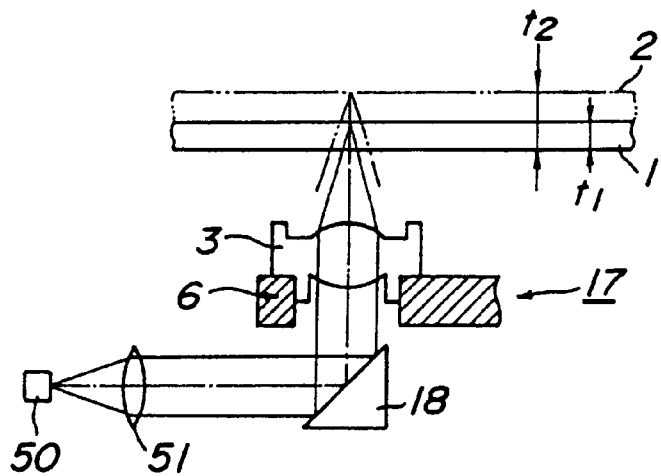
FIG. 1 is an explanatory view showing a first embodiment of an information recording and/or reproducing apparatus according to the present invention.

Now referring to the drawings, there are shown various embodiments of an information recording and/or reproducing apparatus according to the present invention. Like parts are shown by corresponding reference characters throughout the several views of the drawings.

Figure 2:
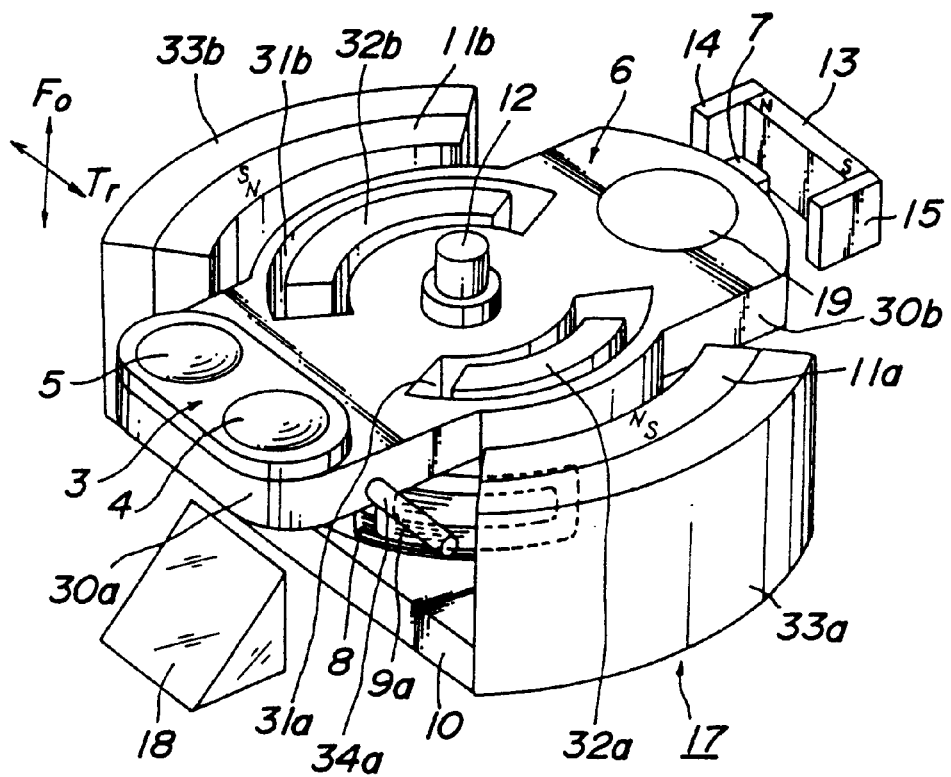
FIG. 2 is a perspective view showing an actuator shown in FIG. 1.

FIGS. 1 to 3 show a construction of the essential parts of a first embodiment of the present invention. As shown in FIG. 1, this embodiment is adapted to two kinds of disks, that is, a disk 1 with a cover glass (protective layer) having a thickness of t1 (=0.6 mm), and a disk 2 with a cover glass (protective layer) having a thickness of t2 (=1.2 mm). The light from a light source 50 illuminates the disks 1 or 2 after passing through a collimator 51 to form a parallel luminous flux and reflected by a mirror 18 and then passing through an actuator 17 having an objective lens 3 and its a drive means. The return light reflected by the disks 1 or 2 is separated from the return path and is incident on a light detector (not shown) by means of a well known method. In this case, the information can be read/written by performing a positional control such as focusing control and tracking control of the objective lens 3 to the disk and a detection process of the read signal based on the return light.

FIGS. 2 and 3 are a perspective view and a plan view showing the detailed construction of an actuator shown in FIG. 1. In this embodiment, the actuator 17 is formed by a so-called, a shaft sliding method. A base 10 of a magnetizable substance has a shaft 12 studded thereon, and a holder 6 is provided on the shaft 12 rotatably and slidably in the axial direction (in the focusing direction Fo). That is, the shaft 12 is made a rotation center of the holder 6. The holder 6 is also provided with projections 30a, 30b arranged at substantially symmetrical positions relative to the shaft 12, respectively, the one projection 30a at the side of the mirror 18 is provided with an opening, to which the objective lens 3 is mounted and the other projection 30b is provided with a balancer 19. In this embodiment, the objective lens 3 is formed by two lenses, that is, a lens 4 (N.A.=0.6) corresponding to the disk 1 and a lens 5 (N.A.=0.4) corresponding to the disk 2, which are made of plastics integrally. This lens 3 is mounted on the holder 6 in such a manner that two lenses 4, 5 are juxtaposed in the tracking direction Tr. That is, these objective lenses 4, 5 are arranged on the same radius about the rotation center of the holder 6. In this case, the position of the holder 6 is substantially the same in the perpendicular direction to the surface of the optical recording medium 1 or 2, in such a manner that the light spot is in respective focusing conditions for the corresponding disks 1, 2.

The holder 6 is provided with two sectorial openings 31a, 31b positioned opposite to each other in the tracking direction about a shaft 12, and inner yokes 32a, 32b provided on a base 10 are arranged in the sectorial openings 31a, 31b. The base 10 is provided with outer yokes 33a 33b so as to make them opposite to the inner yokes 32a, 32b through the holder 6, and permanent magnets 11a, 11b are mounted respectively inside the outer yokes 33a 33b in such a manner that the same poles are positioned opposite to each other. The holder 6 is also provided with a focusing coil 8 wound thereon at lower side and at an outer periphery thereof and then two plane tracking coils 9a,9b and 9c,9d are mounted on the focusing coil 8 at the portions opposite to the tracking direction in such a manner that one vertical arm of the respective tracking coils is opposite to the permanent magnet 11a or 11b. In this way, the magnetic circuit is constructed to effect the magnetic flux on the focusing coil 8 and two corresponding tracking coils 9a,9b and 9c,9d by respective permanent magnets 11a, 11b.

Moreover, the holder 6 is provided, on the projection 30a having the objective lens 3 mounted thereon, with stoppers 34a, 34b for limiting the excessive rotational movement of the holder 6 by abutting them to the outer yokes 33a 33b, and with a piece of magnetizable substance 7 on the projection 30b, having a balancer 19. Moreover, the base 10 is provided with a permanent magnet 13 magnetized in the tracking direction Tr so as to be opposite to the magnetizable substance 7 provided on the holder 6. This permanent magnet 13 is provided with yokes 14,15 at its respective poles.

In the above construction, when the reading/writing operation is performed for the disk 1, pulse-shaped DC currents having a predetermined magnitude in the first direction are applied to the tracking coils 9a,9b and 9c,9d to rotate the holder 6 in the direction of A in FIG. 3, and accompanying this rotation, the magnetizable piece 7 provided on the holder 6 is magnetically sucked by the permanent magnet 13 through the yoke 15, thereby placing the lens 4 over the mirror 18. In this case, the stopper 34b of the holder 6 is abutted to the outer yoke 33b to limit the excessive rotating movement of the holder 6. Under such conditions, the tracking error signals are supplied to the tracking coils 9a,9b and 9c,9d, thereby performing the tracking control by slightly rotating the holder 6 about the shaft 12, and the focusing error signals are supplied to the focusing coil 8, thereby performing the focusing control by sliding the holder 6 along the shaft 12, resulting in a reading/writing operation of the disk 1.

In case of performing a reading/writing operation for the disk 2 from the conditions shown in FIG. 3, pulse-shaped DC currents having a predetermined magnitude in the second direction opposite to the first direction are applied to the tracking coils 9a,9b and 9c,9d to rotate the holder 6 in the direction of B in FIG. 3 against the magnetic attraction force of the magnetizable piece 7 due to the yoke 15, and accompanying this rotation, the magnetizable piece 7 is magnetically sucked by the permanent magnet 13 through the yoke 14, thereby placing the lens 5 over the mirror 18. In this case, the stopper 34a of the holder 6 is abutted to the outer yoke 33a to limit the excessive rotating movement of the holder 6. Under such conditions, as in the case with the above described case, the tracking error signals are supplied to the tracking coils 9a,9b and 9c,9d, thereby performing the tracking control by slightly rotating the holder 6 about the shaft 12, and the focusing error signals are supplied to the focusing coil 8, and performing the focusing control by sliding the holder 6 along the shaft 12, resulting in a reading/writing operation of the disk 2.

The disks 1, 2 are discriminated by providing discriminating sensor holes to a cartridge for accommodating respective disks, and by detecting the presence of the sensor hole with a switch or the like, thereby selecting the corresponding lens as described above in accordance with the discriminated result, resulting in a reading/writing operation of the disk. In case of changing the holder 6 from the reading/writing condition for the disk 2 to the reading/writing condition for the disk 1, the holder 6 is rotated in the direction of A in FIG. 3 against the magnetic attraction force of the magnetizable piece 7 due to the yoke 14 by means of the pulse-shaped DC currents having a predetermined magnitude in the first direction applied to the tracking coils 9a,9b and 9c,9d, thereby placing the lens 4 on the mirror 18, and then the rotating movement of the holder 6 is held by the magnetic attraction force of the magnetizable piece 7 due to the yoke 15.

In addition to the discrimination of the disk by the cartridge explained above, a sensor shown in FIG. 4 may be used for such a discrimination. This sensor is secured to a carriage (not shown) for holding the actuator 17. This sensor comprises a light emitting diode LED placed at its center portion and two photodetectors provided on both sides of the light emitting diode LED in the tracking direction. The light receiving surface of each photodetector is divided into two, so that one photodetector has two photodetector portions PD1 and PD2 and the other photodetector has two photodetector portions PD3 and PD4.

In the case of the disk 1 that the cover glass of the disk is thin and a recording and/or reproducing surface is near the sensor, a large amount of the reflected light of the light emitting diode LED is incident on the photodetectors PD2 and PD3 which are positioned near the light emitting diode LED.

On the contrary, in the case of the disk 2 that the cover glass of the disk is thick and a recording and/or reproducing surface is far and the sensor, a large amount of the reflected light of the light emitting diode LED is incident on the photodetectors PD1 and PD4 which are positioned far and the light emitting diode LED.

Therefore, the signals for discriminating the thickness of the cover glass and the kind of the disk can be obtained by operating the output signals of the photodetectors arithmetically such as [PD2+PD3]−[PD4 +PD1].

Moreover, this sensor is used to perform the following arithmetic operation:

{PD2+PD4}−{PD1+PD3} so that the slant signal of the disk can be obtained. This signal adjusts the slant of the actuator for the disk, so that a preferred signal having no cross talk or jitter can be obtained. In this way, the disk discrimination sensor and the disk slant sensor are commonly used by one sensor, so that the number of the sensors can be decreased.

In order to discriminate the kinds of disk, firstly, either one of the lenses is utilized to read out the information recorded on the control track of the disk, or the bar code shaped information provided on the innermost or outer most periphery portion of the disk, thereby discriminating the kinds of disk with the read result. Therefore, the lenses may be selected by the use of this discriminated result. In this case, it is preferable that firstly, the lens 5 having a small NA (numeral aperture) is used to read out the information, since if the lens having a small NA is used, the deterioration of the spherical aberration becomes small in case of varying the thickness of the cover glass, so that the signal on the disk can easily be read out.

In this way, in the case of the information recording and/or reproducing apparatus selecting the lens by reading out the information of the disk, under the condition of a non-loaded disk, and the switched-on condition, it is preferable to select one of the lenses, preferably, the lens having a small NA.

Figure 7:
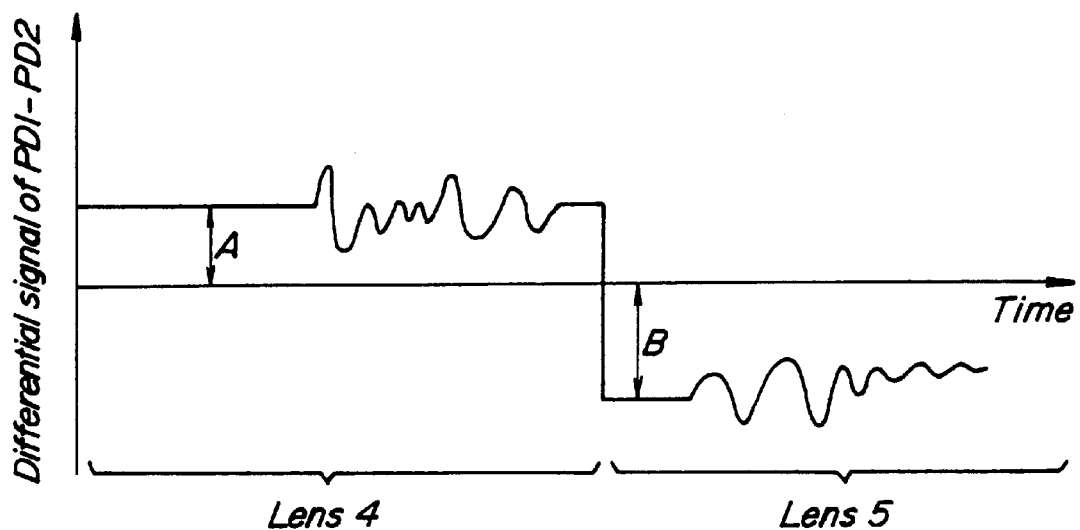
FIG. 7 is an explanatory view showing an output of the lens detecting sensor.

Other embodiments of the sensor for discriminating the lens is explained with respect to FIGS. 5, 6 and 7.

In this embodiment, the projection 30a of the holder 6 is provided, at its tip portion, with reflection members 100a, 100b at the places corresponding to respective lenses 4, 5. The surface of the reflection member is made as a mirror finished surface. The holder 6 is formed by a plastics such as polycarbonate (PC), liquid crystal polymer (LCP) or the like and colored as white color having a high reflection factor. The surface of the holder 6 around the reflecting members 100a, 100b is made as a coarse surface to prevent unreasonable reflected light from being illuminated on the photodiode.

The sensor 101 for discriminating the lens comprises a light emitting diode (LED) 102 positioned at the center of the sensor and first photodetector (PD1) 103a and second photodetector (PD2) 103b, which are positioned at both sides of the LED.

In operation, the light emanated from the light emitting diode 102 is reflected by the reflection member 100a and incident on the photodetectors 103a, 103b, and then the outputs of the photodetectors 103a, 103b are operated arithmetically by a differential amplifier 104 to obtain its differential output [PD1−PD2].

In the condition that the lens 4 is selected, as shown in FIG. 5, the light emanated from the light emitting diode 102 is reflected on the reflecting member 100a and incident on the photodetectors 103a, 103b. In this case, the reflecting member 100a is slanted to the sensor 101 as shown in FIG. 5, and then the light incident on the photodiode 103b is shifted outside thereof, so that the amount of light incident on the photodetector 103b is less than that of the photodetector 103a. Therefore, as shown in FIG. 7, the output of the differential amplifier 104 becomes positive {[PD1−PD2]>0}.

On the contrary, as shown in FIG. 6, under the condition that the lens 5 is selected the reflecting member 100b is slanted to the sensor 101 in the direction opposite to that shown in FIG. 5, so that the output of the differential amplifier 104 becomes negative {[PD1−PD2]<0}, (as shown in FIG. 7).

That is, it can be discriminated whether or not any one of the lenses 4, 5 is selected and used in accordance with positive or negative of DC component of the output from the differential amplifier [PD1−PD2]. Therefore, there is no risk of recording and/or reproducing the information of the disk by the erroneous or undesirable lens.

Figure 8:
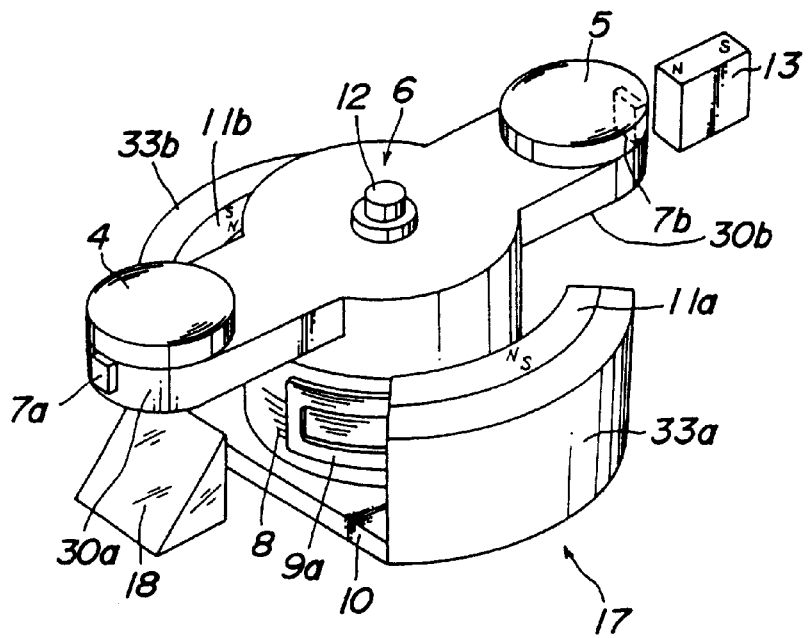
FIG. 8 is a perspective view showing a construction of the actuator used in a second embodiment of the information recording and/or reproducing apparatus according to the present invention.

Moreover, the positional signal in the tracking direction signal of the lenses 4, 5 can also be obtained by the signal caused by decreasing the offset components A or B shown in FIG. 8 from the output of the sensor 101, [PD1−PD2]. Alternatively, the speed signal in the tracking direction of the lenses 4, 5 can be obtained by the signal caused by differentiating the output of the sensor 101, [PD1−PD2]. Therefore, these signals are used as a driving current of the tracking coil and as a coarse access drive of the actuator 17 (not shown).

That is, the positional or speed sensor for the lens can be co-used with the detection or discriminating sensor for the lens, so that the number of the sensors can be decreased.

In this way, according to the present embodiment, the lenses 4, 5 are exchanged to corresponding adequate ones according to the disks 1, 2, that is, the thickness of the cover glass of the disks. As a result, the optical performance, particularly, the spherical aberration due to the thickness of the cover glass as in the case of inserting the aberration compensating optical element, does not deteriorate, and then the optical element for aberration correction is also not inserted between the lenses 4,5 and the disks 1,2, respectively. Hence the differential distance of the lenses 4,5 can be made small and the overall apparatus can be made small.

Moreover, the exchange of the lenses 4,5 performed by the actuator 17 for performing the tracking control without providing a separate exchanging means, so that the construction can be made simple, small and inexpensive. In the conditions, such as the reading/writing condition for the disk 1 and the reading/writing condition for the disk 2, also, an operation neutral position of the holder 6 in the tracking direction Tr thereof is magnetically held by the magnetizable piece 7, the permanent magnet 13 and the yokes 14, 15, so that the tracking control can be made stably.

As the lens 3, moreover, juxtaposed lenses 4, 5 are integrally formed by a plastic molding, so that the distance between the two lenses 4, 5 can be made very small. The rotating angle of the holder 6 in case of exchanging the lenses can also be made small, so that the exchanging control can be made small. The lenses 4, 5 are mounted on the holder 6 in such a manner that light spots for the corresponding disks 1, 2 are positioned in focusing conditions, respectively, at the same positions of the focusing direction of the holder 6, so that the moving amount of the holder 6 in the focusing direction can be made most small.

In the first embodiment, moreover, the actuator 17 is of a shaft sliding system, but other systems, for example, a system of supporting the holder for holding the objective lens by four wires can effectively be applied to the present invention. The operation neutral position of the holder 6 in the tracking direction Tr thereof can be selected by flowing the bias current through only a tracking coil in the desired direction, without using the magnetizable piece 7 and the permanent magnet 13. Alternatively, when the holder 6 is provided with a reflecting member or the like, thereby forming a reflective sensor, it is also possible to detect which of the lenses 4, 5 is selected.

FIG. 8 shows a construction of the essential portion of a second embodiment of the information recording and/or reproducing apparatus according to the present invention. In this embodiment, the construction of the actuator 17 is different from that of the first embodiment, and the same members as those of the first embodiment are shown by the same reference characters as those of the first embodiment and detailed explanation and is omitted. In this embodiment, the projections 30a, 30b formed to the holder 6 are provided with opening portions, respectively, and the lenses 4, 5 are mounted to these opening portions so as to position them over a mirror 18 selectively by rotating the holder 6 by an angle of 180 degrees. To this end, the permanent magnets 11a, 11b and outer yokes 33a, 33b both forming a magnetic circuit are provided below the projections 30a, 30b in order to prevent them from being interfered with the projections 33a, 33b. The projections 30a, 30b are provided at end portions with magnetized pieces 7a, 7b, respectively, and a permanent magnet 13 secured to the base 10 is provided at the position opposite to the mirror 18 through the shaft 12 so as to suck the magnetizable pieces 7a, 7b in case of selectively opposing it to the magnetizable pieces 7a, 7b.

FIG. 8 does not show the inner yokes 32a, 32b illustrated in the first embodiment, but these inner yokes may be mounted to an opening formed in the holder 6 as in the first embodiment, and the lower portion of the holder 6 is provided with a cylinder and the inner yokes may be mounted inner side thereof.

FIG. 8 shows the state that the lens 4 is positioned over the mirror 18, that is, the reading/writing conditions for the disk 1 (see FIG. 1), but in this state, the magnetizable piece 7b provided on the holder 6 is sucked to the permanent magnet 13, thereby limiting the neutral position of the tracking control, so that in this state, the tracking error signals are supplied to the tracking coils 9a, 9b and 9c, 9d, thereby performing a tracking control by slightly rotating the holder 6 about the shaft 12, and the focusing error signals are supplied to the focusing coil 8, thereby performing the focusing control by sliding the holder 6 along the shaft 12, resulting in a reading/writing of the disk 1.

In case of performing the reading/writing operation for the disk 2 (see FIG. 1) from the conditions shown in FIG. 8, the pulse shaped DC current having a given amount in the first direction is supplied to the tracking coils 9a, 9b and 9c, 9d, so that the holder 6 is made to rotate in the given direction against the magnetic attraction force of the magnetizable piece 7b due to the permanent magnet 13. Then, the pulse shaped DC current having a given amount in the second direction opposite to the first direction, is supplied to the tracking coils 9a, 9b and 9c, 9d, at the time that the holder 6 is rotated near 180° over 90°, thereby limiting the rotation of the holder 6 and attraction of the magnetizable piece 7a magnetically by the permanent magnet 13, so that the lens 5 is positioned over the mirror 18 and the neutral position of the tracking control of the lens 5 is limited by the magnetic attraction of the magnetizable piece 7a due to the permanent magnet 13. In this condition, therefore, as in the case of the above case, while performing the tracking control and the focusing control, the reading/writing of the disk 2 can be performed. Even in exchanging the lens 5 to the lens 4, the above operation is performed.

According to this embodiment, the lenses 4, 5 are mounted on the holder 6 symmetrically about the shaft 12, these lenses serve as a counter weight to each other, so that the driving sensibility of the lens can be improved without using the balancer 19 as in the first embodiment.

Figure 9:
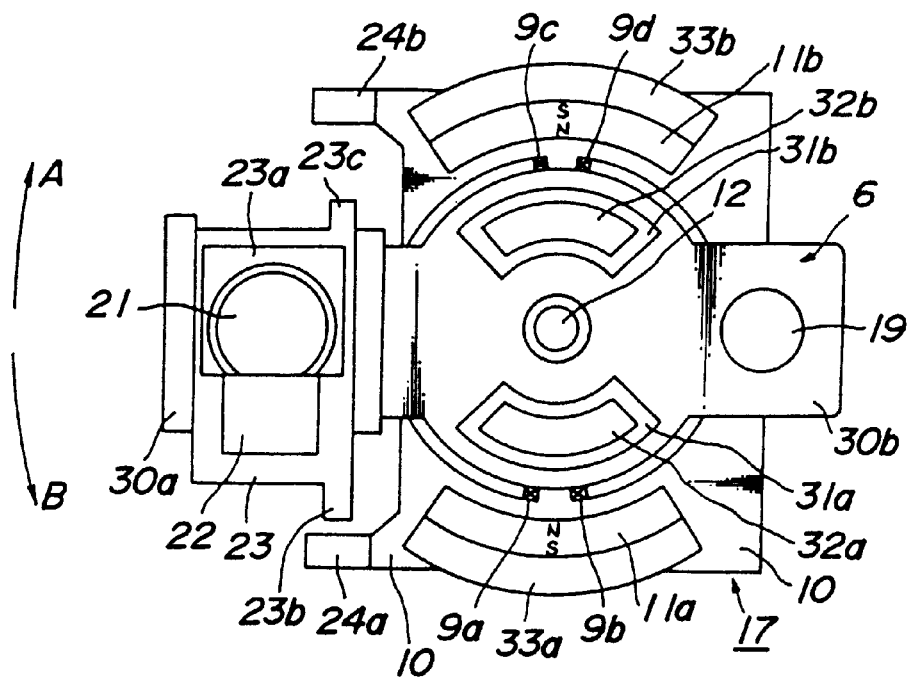
FIG. 9 is a plan view showing a construction of the actuator used in a third embodiment of the information recording and/or reproducing apparatus according to the present invention.
Figure 10:
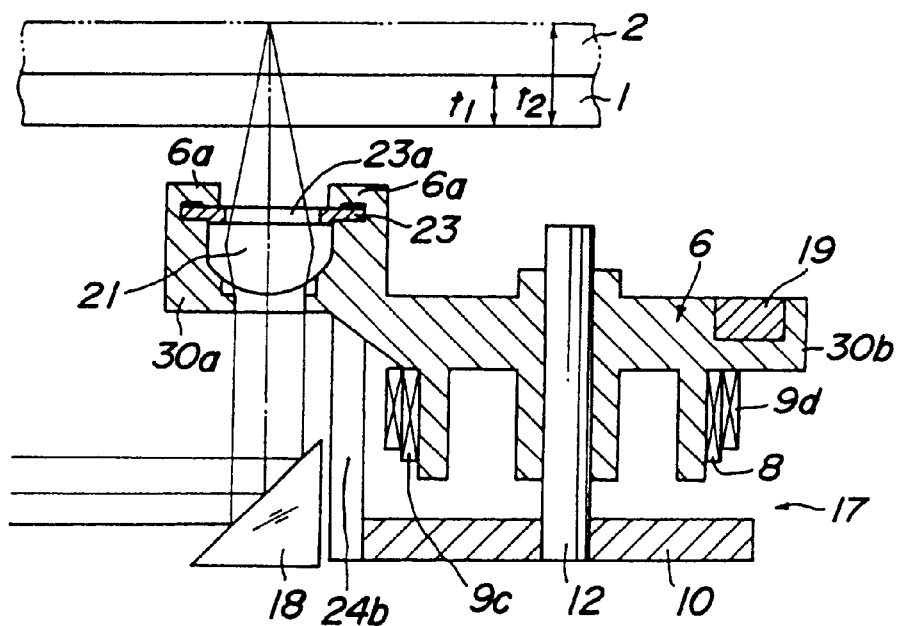
FIG. 10 is a cross-sectional view showing the construction of the actuator used in the third embodiment of the information recording and/or reproducing apparatus according to the present invention.

FIGS. 9 to 11 show a third embodiment of the information recording and/or reproducing apparatus according to the present invention. In this embodiment, one lens corresponding to the disk 2 having the cover glass of t2 in thickness is mounted on the holder 6, and in case of reading/writing the disk 1 having the cover glass of t1 in thickness, a correction optical element 22 is provided on the lens 21 insertably and movably in the focusing direction and in the tracking direction integrally, thereby correcting the spherical aberration due to the difference in thickness of the cover glass of the disk 1. That is, the wave front of the light flux incident on the cover glass is converted. The other members thereof provide the same effect as those of the first embodiment and are shown by the same reference characters as those of the first embodiment, so that detailed explanation thereof is omitted.

The correction optical element 22 is formed by a parallel plate having substantially the same refraction index as that of the cover glass of the disks 1, 2 and having t2−t1 in thickness. This optical element 22 is supported on a plate 23, which is mounted over the lens 21 slidably in the tracking direction on a recess portion 6a formed in the holder 6. This plate 23 is provided with an opening portion 23a adjacent the correction optical element 22 in the tracking direction and with convex portions 23b, 23c in the tracking direction. The base portion 10 is provided with stoppers 24a, 24b so as to engage to the convex portions 23b, 23c of the plate 23, respectively.

In this way, in this embodiment, when performing the reading/writing operation for the disk 2, the pulse shaped DC current having a given amount in the first direction is supplied to the tracking coils 9a, 9b and 9c, 9d, so that the holder 6 is made to rotate in the direction of A in FIG. 9 so as to abut the convex portion 23c of the plate 23 to the stopper 24b of the base 10, thereby sliding the plate 23 on the holder 6, resulting in a positioning of the opening 23a on the lens 21. Then, the pulse shaped DC current having a given amount in the second direction opposite to the first direction, is supplied to the tracking coils 9a, 9b and 9c, 9d, so as to return the plate 23 at the position on which the lens 21 is positioned over the mirror 18. In this condition (the condition shown in FIG. 9), the reading/writing of the disk 2 is performed, while performing the tracking control and the focusing control, as in the case of the above described case.

In case of performing the reading/writing operation for the disk 1, the pulse shaped DC current having a given amount in the second direction is supplied to the tracking coils 9a, 9b and 9c, 9d, so that the holder 6 is made to rotate in the direction of B in FIG. 9 so as to abut the convex portion 23b of the plate 23 to the stopper 24a of the base 10, thereby sliding the plate 23 on the holder 6, resulting in a positioning of the correction optical element 22 on the lens 21.

Then, the pulse shaped DC current having a given amount in the first direction, is supplied to the tracking coils 9a, 9b and 9c, 9d, so as to return the plate 23 at the position on which the lens 21 and the correction optical element 22 are positioned over the mirror 18, thereby correcting the cover glass in thickness of the disk 1 by the correction optical element 22. In this condition (the condition shown in FIG. 11), the reading/writing of the disk 1 is performed, while performing the tracking control and the focusing control, as in the case of the above described case.

According to this embodiment, the amount by which the cover glass of the disk 1 has been decreased in thickness for the disk 2, is corrected by inserting, over the lens 21, the correction optical element 22 in which optical power is not present, so that even when the position of the correction optical element 22 is shifted slightly, the deterioration of the optical aberration is not caused. At the time of the reading/writing operation, also, the correction optical element 22 is made movable with the lens 21 integrally, so that even in the case of a small differential distance of the lens 21, the optical element 22 can be easily inserted over the lens 21. Alternatively, the objective lens and the optical element for converting the wave front in order to correspond to the disks having different thicknesses of the cover glasses, respectively, are formed on the holder integrally, so that the apparatus can be downsized. The detaching of the correction optical element 22 is performed by the actuator 17 performing the tracking control without providing separate exchanging means as in the case of the above embodiment, so that the construction can be made simple, downsized and inexpensive.

In the third embodiment, moreover, the thickness of the cover glass of the disk 1 for the disk 2 is corrected by the correction optical element 22 of parallel plate, but a hologram lens for correcting spherical aberration, or for converting the wave front, such as the conversion of N.A. or the like, can be utilized instead of the correction optical element 22.

What is claimed is:

1. An information recording and/or reproducing apparatus comprising:

a light source;

at least two objective lenses corresponding to at least two kinds of optical recording media having different thicknesses of a protective layer, respectively;

a holder for supporting said objective lenses;

a selection means for selecting said objective lenses in accordance with the optical recording medium to perform recording/reproduction of information, the light from the light source being illuminated on the optical recording medium through the objective lens selected by the selection means; and an objective lens drive means for controlling the relative position of the objective lens for the optical recording medium by driving the holder, wherein said selection means includes at least a part of the construction of the objective lens drive means, thereby selecting the objective lens with the driving force thereof, the two objective lenses being formed integrally as one component.

2. An information recording and/or reproducing apparatus as claimed in claim 1, wherein said holder has substantially the same position in the focusing direction under the conditions that light spots by respective objective lenses are focused on the surfaces of the corresponding optical recording media.

3. An information recording and/or reproducing apparatus as claimed in claim 1, wherein the holder has a rotation center and is able to rotate about the rotation center by the objective lens drive means, and said two objective lenses are arranged on the same radius about the rotation center of the holder.

4. An information recording and/or reproducing apparatus as claimed in claim 3, wherein said two objective lenses are arranged both sides about the rotation center of the holder.

5. An information recording and/or reproducing apparatus as claimed in claim 3, wherein said two objective lenses are juxtaposed in the direction orthogonal to the record tracking direction of the optical recording medium.

6. An information recording and/or reproducing apparatus for recording and/or reproducing information on and/or from at least two different kinds of optical recording media having different protective layer thicknesses, said apparatus comprising:

a light source;

two optical systems respectively corresponding to said two kinds of optical recording media;

a holder for rotatably holding said two optical systems; and a selection means for selecting one of said two kinds of optical systems by rotating said holder in accordance with the optical recording medium being used in said apparatus by detecting indicia provided on a cartridge having the optical recording medium accommodated therein, said indicia indicating the kind of optical recording medium accommodated in said cartridge.

7. An information recording and/or reproducing apparatus for recording and/or reproducing information on and/or from at least two different kinds of optical recording media having different protective layer thicknesses, said apparatus comprising:

a light source;

two optical systems respectively corresponding to said two kinds of optical recording media;

a holder for rotatable holding said two optical systems; and a selection means for selecting one of said two kinds of optical systems by rotating said holder in accordance with the kind of optical recording medium being used in said apparatus by detecting a position on an information recording surface of the optical recording medium being used in said apparatus and the thickness of the protective layer of the optical recording medium being used in said apparatus.

8. An information recording and/or reproducing apparatus for recording and/or reproducing information on and/or from at least two different kinds of optical recording media having different protective layer thicknesses, said apparatus comprising:

a light source for emitting light;

a shaft;

a holder mounted on said shaft to rotate relative thereto;

an objective lens means supported by said holder, for generating at least two light spots respectively corresponding to said at least two kinds of optical recording media, the light from the light source being illuminated on the optical recording medium through the objective lens, thereby performing recording and/or reproducing of the information.

9. An information recording and/or reproducing apparatus as claimed in claim 8, wherein one light spot of said two light spots generated by the objective lens means having a smaller numerical aperture is firstly selected from said two light spots.

10. An information recording and/or reproducing apparatus as claimed in claim 8, wherein the objective lens means for generating at least two light spots comprises at least two lenses formed integrally with each other.

* * * * *